April 16, 1968     F. MISCHE ETAL     3,377,911

PICTURE DEFINING FRAME FOR ALBADA VIEWFINDERS

Filed Dec. 12, 1963

3,377,911
PICTURE DEFINING FRAME FOR ALBADA
VIEWFINDERS
Friedrich Mische, Braunschweig, and Fritz Holzinger, Lehre, Germany, assignors to Voigtländer A.G., Braunschweig, Germany, a corporation of Germany
Filed Dec. 12, 1963, Ser. No. 330,186
Claims priority, application Germany, Dec. 22, 1962, V 14,673
4 Claims. (Cl. 88—1.5)

ABSTRACT OF THE DISCLOSURE

An Albada type viewfinder having a front light ray entry member provided with a concave, partly mirrored inner surface and a picture defining frame spaced from this front member by an axial air gap and positioned substantially in the focal plane of the partially mirrored surface for imaging the frame with the mirrored surface substantially at infinity with respect to the eye of an observer. The picture defining frame is in the form of a frame-shaped relatively thin reflective strip of grained metal. As distinct from a vapor-deposited layer, this frame is an independent body of sheet metal which by itself is separable as a unit from the other components of the viewfinder.

---

This invention relates to Albada type viewfinders, such as used for photographic cameras, and more particularly, to an improved frame construction for an Albada type viewfinder.

Albada viewfinders include a front or light ray entry member having a concave inner surface which is partially mirrored, and further include means providing a picture defining frame in substantially the focal plane of the partially mirrored surface of the front light ray entry member for imaging by such member at substantially infinity in the eye of an observer. It is known to make the frame reflective and with a grained surface structure.

A well known manner in which such viewfinders are constructed involves the vacuum depositing of the metallic frame on the grained surface of a transparent supporting plate. This plate is made usable as the rear, or light ray exit, element of the viewfinder by cementing an additional transparent plate to the grained surface. In constructing a frame and its support in this manner, the refractive indices of the two transparent plates and of the transparent cement joining the same are made, as near as possible, equal to each other so that the frame is mounted within an element having the highest possible transparency. This known manner of constructing the frame support of an Albada viewfinder requires considerable expense and considerable labor.

The primary object of the present invention is to reduce the expense and time involved in manufacturing and assembling an Albada viewfinder, and to make an Albada viewfinder of simple and inexpensive design and which is easy to manufacture, all this being effected without loss of the advantages of the light reflective frame for defining the field of view.

In accordance with the present invention, this object is accomplished by making the frame itself from grained metal foil or from grained thin sheet metal, preferably aluminum. As distinct from a vapor-deposited layer, the picture defining frame of the invention is an independent body of sheet metal which by itself is separable as a unit from other components of the viewfinder. The grained surface of the frame can be given a highly reflective finish by high brilliance oxidation.

In designing a viewfinder with a frame of this type, it is possible to eliminate the separate elements which hitherto have been used as a support for the frame, and the necessity of cementing the frame to other parts in order to compensate for unwanted refraction of light in the grained surface of the frame support, is obviated. Thus, an Albada viewfinder constructed in accordance with the present invention consists, basically, of only a front or light ray entry element having a partially mirrored concave inner surface, and a grained metal strip frame which is separated from the front element by an air space. Both the front element and the frame may be supported in a common housing.

The grained metal strip frame may be supported in the finder housing by a transparent cover plate, which is particularly desirable if the frame consists of grained metal foil and it is not desirable to stretch the foil sufficient to give it, by such stretching, the necessary stiffness or rigidity. The use of a cover plate also protects the interior of the viewfinder against dirt and mechanical damage. In such case, the housing of the viewfinder can comprise a plastic composition material and be formed with a locating shoulder for the front element, a locating shoulder for the cover glass, and means for locating the frame, with the elements being secured in place by deformation of the housing walls particularly in the heated state of the plastic composition material.

As a feature of the invention, a mask, which is in the shape of the frame, may be located in front of the reflecting frame in outwardly spaced relation to the inner margin of the latter so that the reflecting frame appears relatively narrow and clearly outlined for defining the field of view. This mask can be opaque or can be transparent and colored, so that the area bounding the outer margin of the frame image will appear either dark or in color. If the mask is opaque, it may be provided by applying a layer of black lacquer to the outer portions of the metal frame, or a suitably shaped, dark colored mask can be inserted on the front surface of the metal frame to partially delimit the same.

In order properly to position the mask in exactly centered relation with the frame, and thus to obtain a frame image having a uniform width, the metal frame may be provided with a stepped margin, or with other simple means, for assuring such centered position of the mask.

Furthermore, indicia, such as scales, may be provided on the reflecting frame in such a manner that they are visible to the observer in the area surrounding the frame when the observer looks through the viewfinder. If an opaque mask is used, such mask may be provided with a cutout leaving the area of the scale free of masking. In front of that portion of the reflecting frame having the indicia or other markings, an indicator cooperable with the indicia may be provided. Such indicator may be, for example, the pointer of an exposure meter installed in the camera, whereby the pointer will be visible to the observer, together with a scale of diaphragm openings, in the area surrounding the field of view defining frame.

For an understanding of the principles of the invention, reference is made to the following description of typical embodiments thereof as illustrated in the accompanying drawings. In the drawings.

Figure 1:
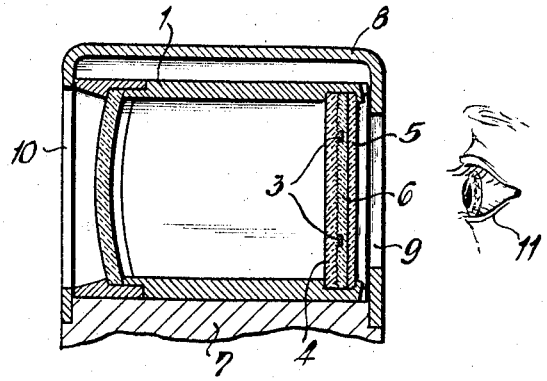
FIG. 1 is a somewhat schematic longitudinal sectional view of a known type of Albada viewfinder as mounted inside the hood or cover of a camera body.

The known Albada viewfinder illustrated in FIG. 1 comprises a housing 1 having a front light ray entry member 2 with a concave partially mirrored inner surface, and a rear element which carries a field of view defining frame 3 positioned in substantially the focal plane of the partially mirrored inner surface of the element 1, the rear element being separated from the front element by an axial air gap. The rear element comprises a transparent plate 4, with a grained rear surface, the frame 3 positioned on the grained rear surface of plate 4, as by vacuum deposition of reflective metal, and a plano-parallel transparent plate 5 cemented to plate 4. Plates 4 and 5 are cemented together by a cement 6 which has a refractive index as near as possible to the refractive indices of the plates 4 and 5, thus resulting in the provision of a clear, transparent rear element 4–5–6 and carrying the grained frame 3 for defining the field of view.

As illustrated in FIG. 1, the viewfinder is mounted inside the hood or cover 8 of the camera, and the latter is provided with windows or openings 9 and 10 whereby the eye 11 of an observer may view the object to be photographed. Hood 8 is mounted upon the body 7 of the camera, which is only partially illustrated and in section. As previously stated, the arrangement shown in FIG. 1 requires a comparatively high use of labor and material, which increases the cost and weight of the viewfinder.

Figure 2:
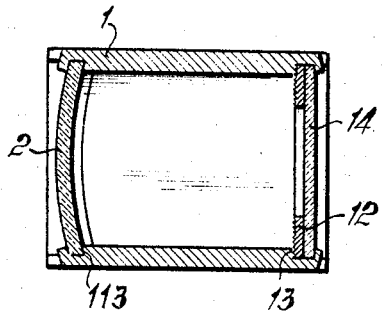
FIGS. 2, 3 and 4 are somewhat schematic longitudinal cross sections of various embodiments of the Albada viewfinder in accordance with the present invention.

A viewfinder operating on the same principles as that shown in FIG. 1, but embodying the principles of the present invention, is illustrated in FIG. 2. As in FIG. 1, the viewfinder includes a housing 1 and a front light ray entry element 2 having a partially mirrored concave inner surface. However, in the viewfinder shown in FIG. 2, and in accordance with the present invention, a field of view defining frame 12, comprised of metal foil or of thin sheet metal and with its surface facing the object being grained or corrugated by chemical or mechanical treatment, is mounted in housing 1 in substantially the focal plane of the semi-light permeable mirror formed by the partially mirrored concave inner surface of the front light ray entry element 1. Frame 12 preferably comprises high brilliance oxidized aluminum sheet material, so that it is highly reflective. The frame can be assembled in the housing, in a simple manner, by moving it into housing 1 from the rear and against a shoulder 13 formed for example, by deformation of the protruding rear edge of housing 1. Front element 2 is correspondingly held in position against a shoulder 113 at the front end of housing 1.

For mounting the front element 2 and the frame 12 in the housing, the latter may be formed of a plastic composition material which can be deformed easily when in the heated state. While the viewfinder is able to function fully when it comprises only the front element 2 and the grained frame 12, a transparent plate or cover 14 is inserted behind the frame to protect the latter and to protect and confine the space within the viewfinder housing 1.

In the embodiment shown in FIG. 2, frame 12 is circumscribed exteriorly by the wall of housing 1. It is, however, possible to provide the frame with a smaller outline or a narrower border in order to obtain a narrower and sharper image of the frame or in order to have an area around the viewfinder image available for other purposes. Thus, and referring to FIG. 3, a mask 15 is placed immediately in front of frame 12 in the direction toward the object or toward the front light ray entry member 2. Mask 15 covers a margin of uniform width on the outer portion of frame 12. The mask may either be a separate part, such as a frame shaped piece of black sheet metal, or it may be formed by a dark lacquer coating directly on frame 12.

Figure 4:
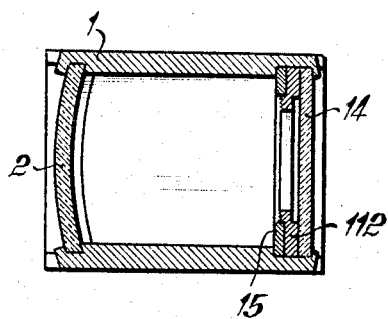

If the mask is made in the shape of a separate frame, it is useful, for assembly purposes, to form the picture limiting frame with a margin providing a step or shoulder for accurately locating the mask with respect to the image limiting frame and assuring a centered relation of these parts. Such an arrangement is shown in FIG. 4, wherein picture limiting frame 112 is formed with a step or shoulder all the way around it, this step or shoulder providing an accurate locating surface for mask 15 which, in this case, is formed from black sheet metal. Thereby, an exactly uniform width of frame 112 is visible to one looking through the viewfinder.

Other means for assuring proper centering of the mask on the frame can be used within the scope of the invention. For example, bent lugs may be provided on frame 12 and within which the frame 15 of black sheet metal may be centered, or guide pins may be provided on frame 15 to cooperate with holes in frame 12.

If it is desired to provide a colored exterior margin for the image, located exteriorly to the image of the frame defining field of view, a bright colored lacquer coating or a transparent colored film can be used in place of the mask 15, and will make that part of the frame covered by the mask appear to have the corresponding color.

Figure 3:
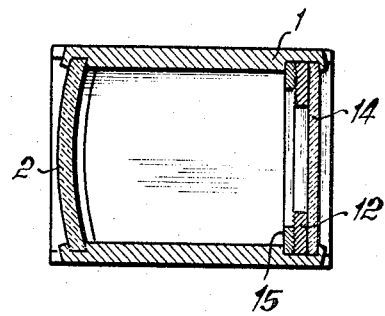

A viewfinder constructed in accordance with the invention, and particularly in accordance with the embodiment shown in FIGS. 3 and 4, provides a particular simple arrangement whereby markings, such as scales and the like, may be made visible in the viewing area. In order to effect this, it is necessary only to apply the markings, etc., to the front face of the field defining frame. The mask placed in front of the field defining frame must then be cut out or made transparent in the area of said markings.

Figure 5:
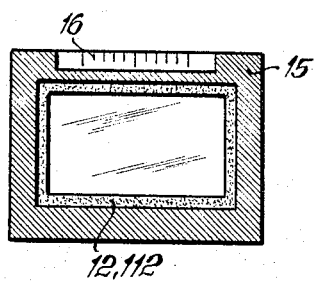
FIG. 5 is an elevational view illustrating the image, of one embodiment of the viewfinder, as it appears to an observer looking through the viewfinder.

FIG. 5 illustrates the appearance of such a frame as seen through a viewfinder. Thus, the observer sees a scale 16 in a cutout portion of mask 15. A suitable indicating means, which is not illustrated and which may be, for example, the pointer of an exposure meter, may cooperate, in a manner known per se, with the scale. The pointer can then be observed in whatever position it occupies. In FIG. 5, 12 (112) indicates the field of view defining frame or that portion thereof which can be seen inside of mask 15.

While specific embodiments of the invention have been shown and described in detail to illustrate the application of the principles of the invention, it will be understood that the invention may be embodied otherwise without departing from such principles.

What is claimed is:

1. An Albada viewfinder comprising, in combination, a front light ray entry member having a concave partially mirrored inner surface; a picture defining frame in the form of a frame-shaped relatively thin reflective strip of grained metal, said frame being an independent body of sheet metal which by itself is separable as a unit from other components of the viewfinder; means positioning said picture defining frame in spaced relation to said front member, with an axial air gap therebetween, and substantially in the focal plane of said partially mirrored surface for imaging by the latter at substantially infinity to the eye of an observer; and a frame shaped mask covering the reflective surface of said frame facing said concave partially mirrored inner surface and having its inner margin spaced outwardly of the inner margin of said picture defining frame and parallel to the latter to expose a substantially narrow inner marginal portion of said picture defining frame, and including a shoulder on said picture defining frame disposed at the outer margin of said inner marginal portion, said shoulder cooperating with said mask to assure centering of the latter relative to said picture defining frame.

2. An Albada viewfinder, as claimed in claim 1, in which said mask comprises transparent colored material.

3. An Albada viewfinder, as claimed in claim 1, including indicia markings on the outer marginal portion of said picture defining frame and exposed by said mask.

4. An Albada viewfinder, as claimed in claim 2, including indicia markings on an outer marginal portion of said picture defining frame and visible through said transparent colored mask.

References Cited

UNITED STATES PATENTS

| | | | |
|---|---|---|---|
| 2,187,057 | 1/1940 | Sauer | 88—1.5 |
| 2,217,930 | 10/1940 | Zimmermann | 88—1.5 |
| 3,182,546 | 5/1965 | Papke | 88—1.5 |

FOREIGN PATENTS 853,622  11/1960  Great Britain.

DAVID H. RUBIN, *Primary Examiner.*

JEWELL H. PEDERSEN, *Examiner.*

R. J. STERN, *Assistant Examiner.*